US006631697B1

(12) United States Patent
Solze

(10) Patent No.: US 6,631,697 B1
(45) Date of Patent: Oct. 14, 2003

(54) ANIMAL ASSISTING APPARATUS

(76) Inventor: Dallas Solze, 14837 Detroit Ave., No. 312, Lakewood, OH (US) 44107

( * ) Notice: Subject to any disclaimer, the term of this patent is extended or adjusted under 35 U.S.C. 154(b) by 0 days.

(21) Appl. No.: 09/714,624

(22) Filed: Nov. 16, 2000

(51) Int. Cl.[7] .............................................. A01K 29/00
(52) U.S. Cl. ..................................................... 119/728
(58) Field of Search ......................... 119/96, 769–771, 119/856, 907, 497, 792, 728

(56) References Cited

U.S. PATENT DOCUMENTS

| 3,406,661 A | | 10/1968 | Parkes |
| 4,530,309 A | * | 7/1985 | Collins .......................... 119/96 |
| 4,559,906 A | * | 12/1985 | Smith ........................... 119/96 |
| 4,644,902 A | * | 2/1987 | Doyle ........................... 119/96 |
| D330,273 S | | 10/1992 | Cernek |
| 5,193,486 A | * | 3/1993 | Kitchens ...................... 119/725 |
| 5,443,037 A | | 8/1995 | Saleme |
| 5,511,515 A | | 4/1996 | Brown et al. |
| 5,531,187 A | | 7/1996 | Ward |
| 5,845,606 A | | 12/1998 | Hartman |
| 5,911,200 A | * | 6/1999 | Clark .......................... 119/864 |
| 5,913,285 A | | 6/1999 | Pritchard |
| 6,070,557 A | | 6/2000 | Hibbert |
| 6,216,636 B1 | | 4/2001 | Butchko |

OTHER PUBLICATIONS

Advertisement: "Have you ever had a crazy idea", *People Magazine*, Aug. 7, 2000.
Advertisement: "Doggie Bag" a product of Collar Craft/Petite Originals, Mt. Vernon, MO.

* cited by examiner

Primary Examiner—Charles T. Jordan
Assistant Examiner—Bret Hayes
(74) Attorney, Agent, or Firm—Calfee, Halter & Griswold LLP

(57) ABSTRACT

An apparatus is provided for assisting a large dog traveling on an incline. The apparatus includes a support member and two handles attached to the support member. When a lifting force is applied to the handles, the weight of the dog is partially supported and partially transferred to the support member resulting in increased comfort for the dog.

20 Claims, 3 Drawing Sheets

ANIMAL ASSISTING APPARATUS

FIELD OF THE INVENTION

This invention relates generally to an apparatus for use with animals and more specifically to a device which can transfer a percentage of the weight of the animal to a lifting device.

BACKGROUND OF THE INVENTION

Relieving an animal of a percentage of its own body weight is important when that animal is recovering from an injury to the hip or other weight-bearing body part, is aged and has difficulty in walking, or when a degree of control needs to be exerted over the animal when walking. A common situation involves an injured or aged dog with a bad hip which must be assisted in traversing inclines, typically stairs. While, ideally, the entire weight of the animal is relieved by lifting the animal, many dogs are typically too large or too heavy to be completely lifted or carried. In such an instance, assistance by relieving even a percentage of the animal's weight from the injured hip is beneficial.

Other animal apparatus have been used which wrap around the animal and transfer the animal's entire weight to a lifting device, typically an individual. One example is shown in the U.S. Pat. No. 5,845,606 to Hartman. This apparatus is a complex series of multiple straps. One drawback of the apparatus described in the '606 patent is that the apparatus must be looped around both the front torso and the rear legs of the animal, thus, it is time consuming to put into place. Furthermore, the apparatus of the '606 patent is particularly unhelpful in relieving a percentage of a dog's weight on the dog's front legs and hips when such a dog is traveling up an incline; the position of the handle on an apparatus of the '606 patent actually tends to increase the force on the front end of a dog during a journey up an incline, as an upward force applied at the handle will tend to lift the back legs of the dog and disadvantageously transfer additional weight to the front legs. A second example is shown in U.S. Pat. No. 4,644,902 to Doyle. This apparatus comprises a sling with holes allowing passage of the animals legs and feet. One drawback of the apparatus described in the '902 patent is that the sling must be large enough to completely lift the animal. If such a device is used to completely lift a large dog off of the ground, the device would be bulky as well as difficult to place around the dog's legs. Furthermore, the apparatus of the '902 patent functions only with an animal of significantly small size and weight so as to allow an individual to completely life such an animal off of the ground, and is particularly unhelpful for a large dog which, due to its size and weight, could not be completely lifted off the ground easily by an individual.

A simple apparatus for animals which are too heavy to lift entirely, which transfers weight from only one area of the animal as necessary, and which is easily and quickly applied to an animal is desired.

SUMMARY OF THE INVENTION

The present invention overcomes disadvantages in the prior art by providing an improved and simple assisting apparatus. In one aspect of the invention, the invention provides an apparatus for assisting a large dog traveling on an incline, comprising a support member and a first and second handle attached hereto. The first and second handles are attached to the support member at an angle consistent with the angle of incline to be traversed whereby the weight of the dog is substantially evenly dispersed along the support member where the support member contacts the dog, namely, under the front shoulders and the ribcage. The apparatus is compact and can be carried easily by an individual. It can be placed upon the dog and removed quickly and easily as compared to devices of the prior art.

In another aspect of the invention, the invention further provides a securing mechanism for securing the apparatus on a dog. This securing mechanism includes a securing device for connecting the ends of the support member together, and may further include a strap system which maintains the position of the apparatus on the dog.

These and other aspects of the invention are herein described in particularized detail with reference to the accompanying Figures.

DETAILED DESCRIPTION OF THE INVENTION

Figure 1:
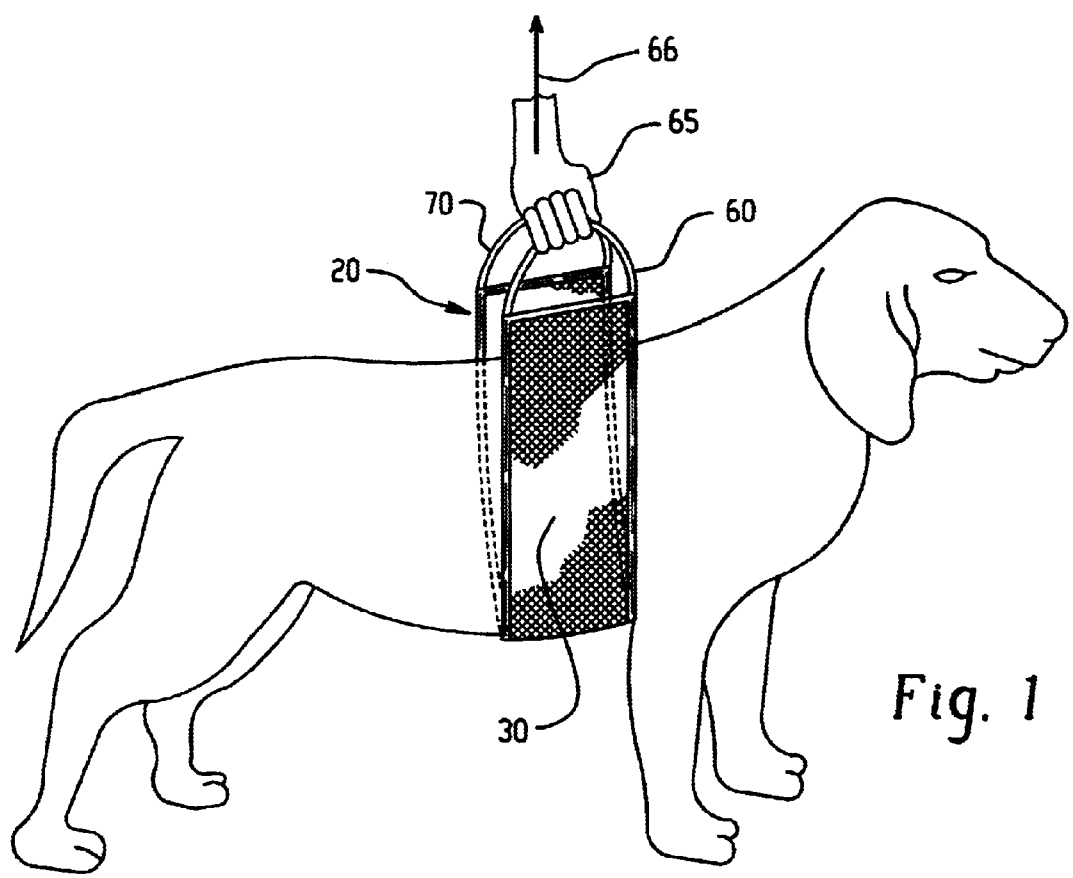
FIG. 1 is a view of an apparatus of the present invention being used on a dog.

Referring to FIG. 1, an assisting apparatus 20 of the present invention is shown in use on a large dog. The assisting apparatus 20 comprises a support member 30 and a first and second handle 60 and 70. Support member 30 is placed under the front shoulders of the large dog whereby when a lifting force 66 is applied to handles 60 and 70, a certain percentage of the weight of the animal is borne by the support member 30, and such borne weight is distributed by the support member 30 substantially evenly to the undersides of the large dog's shoulders and to the lower chest area including the ribcage of the large dog.

Figure 2:
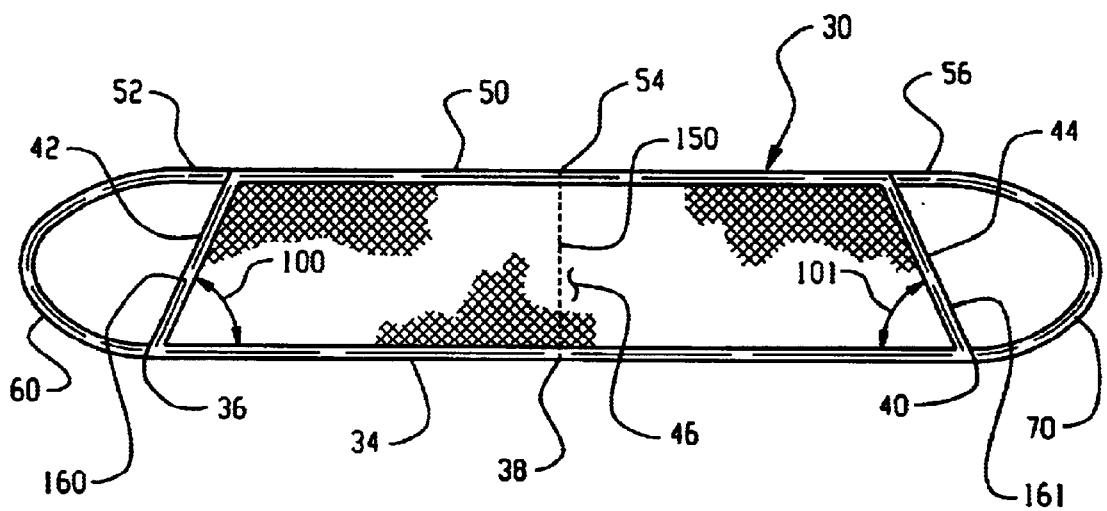
FIG. 2 is a top view of an apparatus of the present invention.

Referring to FIG. 2, the support member 30 has a leading edge 34 and a trailing edge 50. The leading edge 34 includes a first end 36, a mid-point 38, and a second end 40. Mid point 38 is defined by the center of a line which defines the distance between first end 36 and second end 40. The length of the leading edge, defined as the length of a straight line between first end 36 and second end 40 is in the range of 25 inches to 45 inches. In an embodiment, the length of the leading edge is 35 inches. The trailing edge 50 has a first end 52, a mid-point 54, and a second end 56. Mid point 54 is defined by the center of a line which defines the distance between first end 52 and second end 56 of the trailing edge 50. The length of the trailing edge 50, defined as the length of a straight line between first end 52 and second end 56 and is in the range of 19 inches to 39 inches. In an embodiment, the length of the trailing edge 50 is 29 inches. The length of the leading edge 34 exceeds the length of the trailing edge 50 by an amount in a range of 0.5 inch to 13 inches. In an embodiment, the length of the leading edge 34 exceeds the length of the trailing edge 50 by 3 inches. The support member 30 defines first and second support angles 100 and 101 of substantially equal magnitude. First support angle 100 is defined by the intersection of a line defined by the length of the leading edge 34 and a line defining the distance between the first end of the leading edge 36 and the first end of the trailing edge 52, wherein the magnitude of the first support angle 100 is in the range of 25 degree to 75 degrees. In an embodiment, the magnitude of the first support angle 100 is 60 degrees. Second support angle 101 is defined by the intersection of a straight line defined by the length of the leading edge 34 and a line defining the distance between the second end of leading edge 40 and the second end of the trailing edge 56, wherein the magnitude of the second support angle 101 is in the range of 25 degree to 75 degrees.

Figure 3:
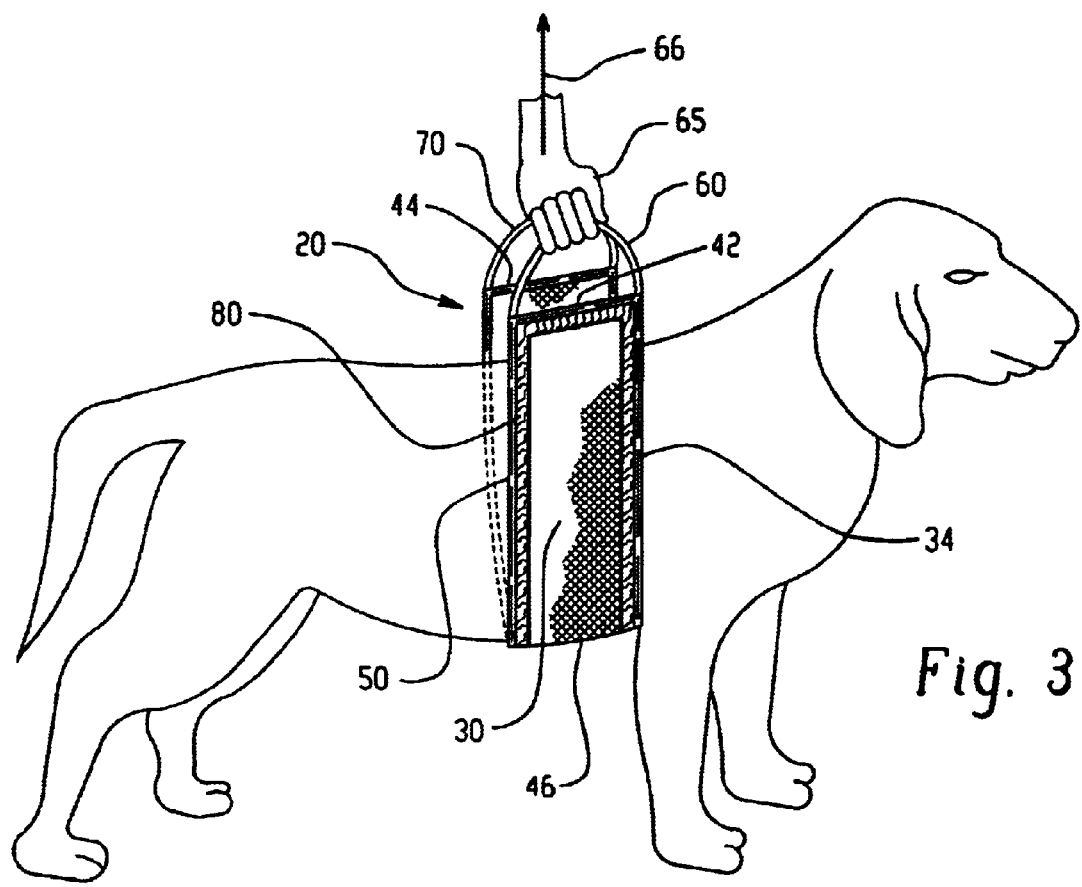
FIG. 3 is a view of an apparatus of the present invention being used on a dog.

Referring to FIG. 3, the support member 30 is flexible and typically takes on a U-shape when used to transfer the weight of a dog to a lifting device 65 such as a human being. In an embodiment, support member 30 defines a first and second upper edge 42 and 44 and a bottom 46. Referring to FIG. 2, a baseline 150 is defined by the support member 30 as a line from the mid point 38 of leading edge 34 to the mid point 54 of trailing edge 50 along the bottom of the support member 46. The first upper edge of the support member 42 defines a slope 160 in relation to the baseline 150. Similarly, the second upper edge of the support member 44 defines a slope 161 in relation to the baseline 150. The slope 160 of the first upper edge 42 is substantially equal to the slope 161 of the second upper edge 44.

Figure 5:
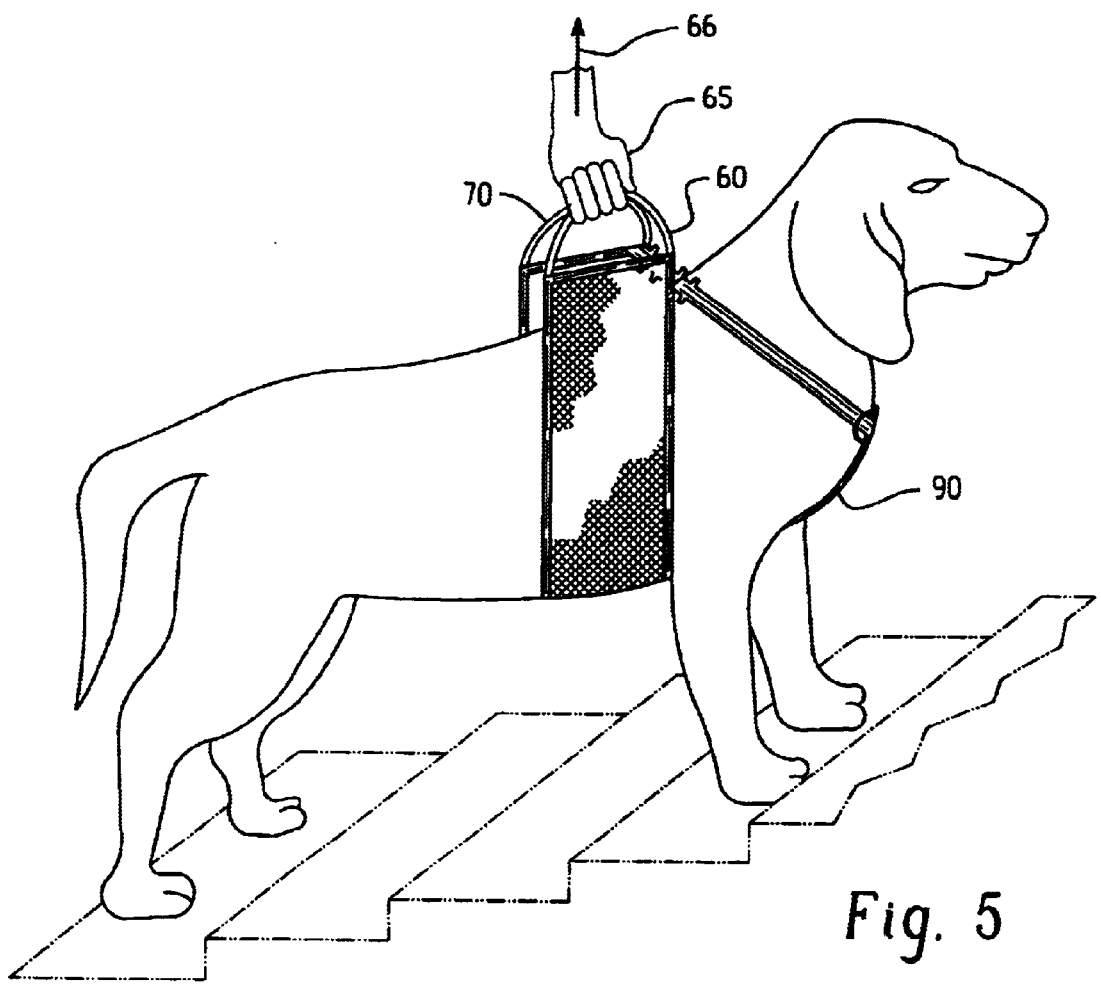
FIG. 5 is a view of an apparatus of the present invention with the strap system being used on a dog walking up an incline.

Referring to FIGS. 2 and 5, the slopes 160 and 161 are generally consistent with the slope of an incline to be traversed by an animal. In an embodiment, slopes 160 and 161 are substantially equivalent to a slope of some conventional stairways, for example, 60. The application of an apparatus of the present invention to a large dog recovering from hip surgery attempting to climb such a stairway illustrates some of the advantages of the present invention. The support member 30 of an apparatus of the present invention is placed under the front shoulders of the large dog so that the width of the support member 30 at the baseline 150 contacts the under-shoulder and lower chest area covering the ribcage of the dog. The support member 30 is further orientated so that the leading edge 34 of the support member 30 is towards the front of the dog and the trailing edge 50 is towards the back of the dog. In this fashion, the slopes 160 and 161 are oriented consistently with the slope of the stairway.

As the dog begins to traverse the incline of the stairway, an individual grabs the handles 60 and 70 attached to the support member 30 and exerts an upward force 66 on the handles 60 and 70 in a sufficient amount to ease the entire work-load of climbing off of the dog. Due to the handles 60 and 70 contacting the support member 30 at points on a slope substantially equal to the slope of the incline, the upward force 66 exerted on the handles 60 and 70 is evenly distributed to the support member 30 and specifically to the baseline 150 of the support member 30. The even distribution of such force supporting the weight of the dog adds to the comfort of the dog in that no one particular part of the dog which contacts the baseline 150 of the support member 30 absorbs more of the force than any other part. Additionally, the force 66 is not unevenly distributed to the trailing edge 50 of the support member 30, as would occur if, for example, there was no slope to the upper edges 42 and 44.

Furthermore, an individual attempting to exert an upward force 66 on an apparatus of the present invention will tend to exert such a force in a direction both upwards and towards the top of the stairway in an attempt to assist the animal in an upwards and forwards direction. The forward-directed force component tends to shift distribution of the upward force to the leading edge 34 of the support member 30, cutting into the shoulders of the dog and tending to bunch the support member 30 forwards, leading to discomfort by the dog. The sloped upper edges 42 and 44 of the present invention encourage the individual exerting the force to grab the handles 60 and 70 slightly forward of the center of each handle. Particularly, the sloped upper edges 42 and 44 to which the handles 60 and 70 are attached shift the center of gravity of the apparatus as measured by the handles from a point in the center of the handles to a point slightly forward of the handles. In grasping the handles 60 and 70 and exerting an upward force 66, the individual will attempt to grasp the handles so as to exert a force upon the point which is at the center of gravity of the apparatus. By grasping the handles 60 and 70 slightly front of center and applying an upwards and forwards force, such a force is evenly distributed by the handles attached to the sloped upper ends 42 and 44, and the dog does not experience discomfort from bunching of the support member 30 or uneven support from the leading edge 34 of the support member 30.

Referring to FIG. 3, support member 30 is made from single fill cotton duct. In alternate embodiments, the support member 30 is made from any other suitable material or blend thereof, including cotton, nylon, polyester or leather. The support member 30 functions to support a dog and transfer a percentage of the dog's weight, in conjunction with the handles 60 and 70, to a lifting device 65 which exerts a lifting force 66. The support member 30, when the apparatus 20 is being used, is situated beneath the shoulders of the animal. In an embodiment, one or more reinforcing members 80 are attached to the support member 30 along the leading edge 34 and trailing edge 50. The size of the support member 30 varies according to the size of the animal being supported. The width of the support member 30 is in the range from about 5 inches to 25 inches. In an embodiment, the width of the support member at the baseline is 8 inches.

Referring to FIGS. 2 and 3, the first and second handle 60 and 70 are made of flexible material and when the apparatus is in use, extend to form a circular shape. The handles 60 and 70 are made from a cotton webbing material which supports at least 600 pounds of force. In alternate embodiments, the handles 60 and 70 are made from any other suitable material or blend thereof, including cotton, nylon, polyester or leather, all of which support at least 300 pounds per square inch. The handles 60 and 70 function as a weight transfer mechanism between the support member 30 and the lifting device 65. The lifting device 65 is typically an individual person. Referring to FIG. 2, the first handle 60 is attached to the first end of the leading edge 36 of the support member 30. The first handle 60 is also attached to the first end of the trailing edge 52 of the support member 30. Correspondingly, the second handle 70 is attached to the second end of the leading edge 40 of the support member 30 as well as the second end of the trailing edge 50 of the support member 30. The first and second handles 60 and 70 are configured to allow simultaneous grasping by a single lifting device 65, wherein the flexible handles form the rough shape of an inverted parabola wherein the lifting device 65 applies an upwardly directed force 66 at the apex of the parabola and this force is evenly transferred to the support member 30 by the parabolic extensions of each handle 60 and 70 extending to and connecting with the first and second ends of the leading and trailing edges 34 and 50. The upwardly directed force 66 is, thus, transferred by the support member 30 to the area around the baseline 150 of the support member and under the shoulders of the large dog. In an embodiment, the handles 60 and 70 are rigid loops constructed of any suitable rigid material or a combination of flexible material and rigid material. In an additional embodiment, the handles 60 and 70 include a rigid component for contact with lifting device 65 and a flexible component to connect each edge of the rigid component to each respective edge of the leading and trailing edge.

In an additional embodiment, the leading edge 34 and the trailing edge 50 of the support member 30 are substantially parallel to each other.

Figure 4:
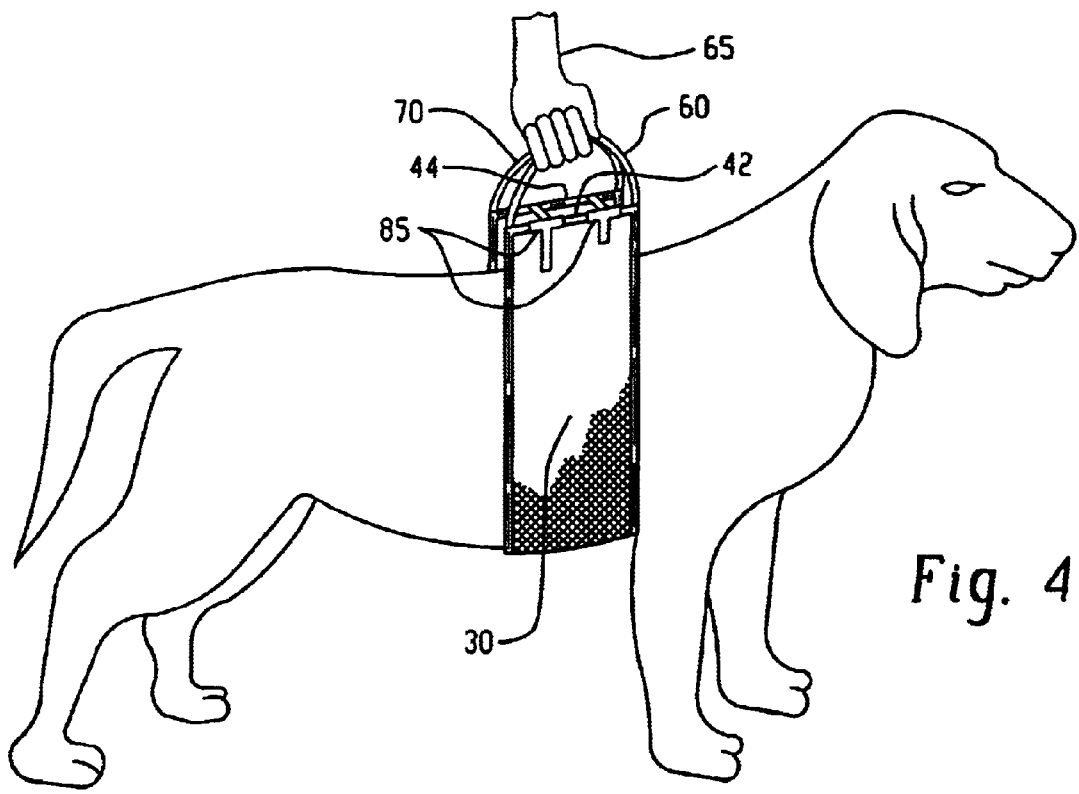
FIG. 4 is a view of an apparatus of the present invention with connection means being used on a dog.

Referring to FIG. 4, in an embodiment, an assisting apparatus of the present invention further includes connecting mechanism 85 for securing the support member 30 around the animal, wherein the connecting mechanism 85 includes individual fasteners such as snaps, buckles, tie-straps, or belts. In another embodiment, connecting mechanism 85 is a strap or straps in combination with any of the fasteners mentioned above. The straps have an adjustable length. The fasteners are made from plastic or other suitable materials including metal. The straps are made from a cotton webbing material which supports at least 600 pounds of force. In alternate embodiments, the straps are made from any other suitable material or blend thereof, including cotton, nylon, polyester or leather, all of which support at least 300 pounds per square inch. The connecting mechanism 85 functions to secure the support member 30 around the animal. The support member 30 wraps around the animal in a "U" or "O" shape and the connecting mechanism 85 helps maintain that shape. When the support member 30 is wrapped around the animal in an "O" shape and the connecting mechanism 85 engaged, the first and second upper edges 42 and 44 define a gap therebetween. The gap has a width of 0.5 to 4 inches. In an embodiment the gap has a width of 2 inches. The connecting mechanism 85 typically exists in pairs. The connecting mechanism 85 is attached to the support member 30 along the first and second upper edges 42 and 44. In another embodiment, the connecting means 85 may be attached to the support member 30 at a position other than along edges 42 and 44.

Figure 6:
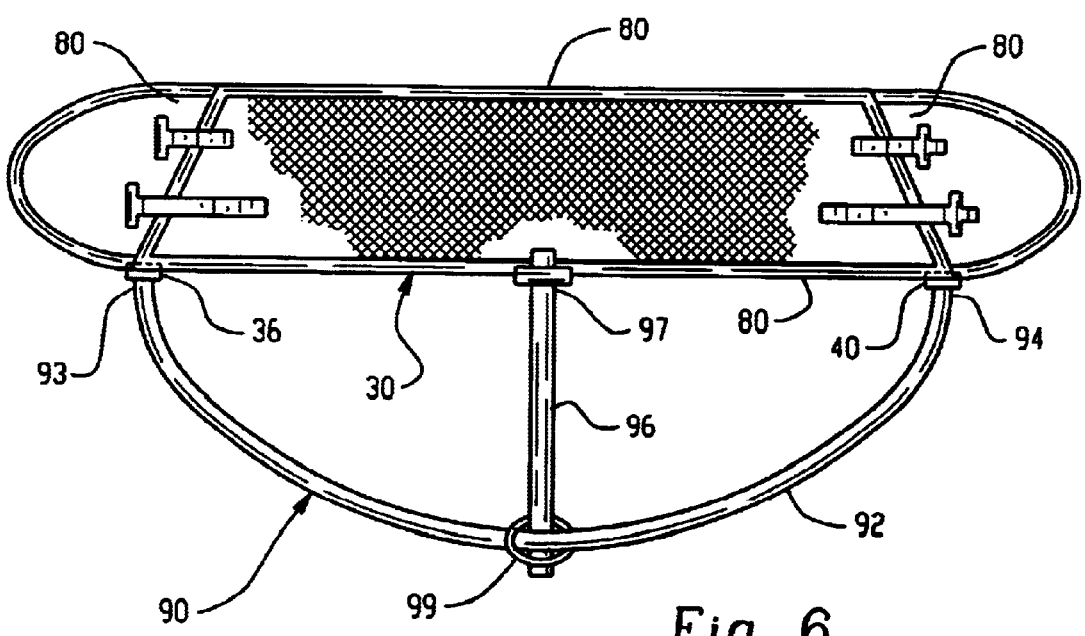
FIG. 6 is a top view of an apparatus with a strap system.

Referring to FIGS. 5 and 6, in an embodiment, the support member 30 further includes a strap system 90. The strap system 90 comprises a first strap 92 and a second strap 96. Each strap is made from a cotton webbing material which supports at least 600 pounds of force. In alternate embodiments, the straps are made from any other suitable material or blend thereof, including cotton, nylon, polyester or leather, all of which support at least 300 pounds per square inch. The strap system 90 functions to keep the support member 30 aligned on the animal. The strap system 90 also functions to restrict the support member 30 from migrating to a position away from the animal's shoulders. The strap system 90 is attached to the support member 30. The first strap 92 has a first end 93 attached to the first end of the leading edge of the support member 30. The first strap 92 has a second end 94 attached to the second end 40 of the leading edge of the support member 30. The second strap 96 has a first end 97 which is attached to the midpoint 38 of the leading edge 34 of the support member 30. The second strap 96 is slidingly engaged with the first strap 92. The first and second straps 92 and 96 may be attached to the support member 30 by fasteners such as snaps, buckles, tie-straps, or belts. The second strap 96 is slidingly engaged with the first strap 92 using a loop 99 which is attached to the second strap 96 and which circumscribes the first strap 92.

Referring to FIG. 3, reinforcing members 80 are strap shaped flexible solids. Reinforcing members 80 may be made of any material used to make the handles 60 and 70 or straps 92 and 96 within the strap system 90. Reinforcing members 80 function to add strength and durability to the support member 30. Reinforcing members may be attached along one or more of the edges of the support member 30.

Referring to FIGS. 4 and 5, a method for using the animal apparatus 20 includes assisting a dog to travel an incline. The method includes placing a support member 30 beneath the shoulders of the dog. A lifting device 65, typically an individual, grasps the handles of the apparatus and lifts, thus displacing a percentage of the weight of the animal to the support member 30. In another method, connecting mechanism 85 attached to the support member 30 are connected to secure the support member 30 to the dog before lifting of the dog occurs. In yet another embodiment of the method a strap system 90 may be placed around the sternum and the legs of the animal and attached to the support member 30 to align the support member with respect to the dog prior to lifting the dog.

Although the invention has been shown and described with reference to certain preferred and alternative embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. An apparatus for assisting a large dog traveling on an incline comprising:
    a) a support member, the support member having;
        i) a leading edge having a first end, a mid point and a second end;
        ii) a trailing edge having a first end, a mid point and a second end;
        iii) wherein the distance between the leading edge first and second ends exceeds the distance between the trailing edge first and second ends;
        iv) wherein a straight line between the mid point of the leading edge and the mid point of the trailing edge defines a baseline, the baseline having a slope in relation to a straight line between the leading edge first end and the trailing edge first end, and the baseline having a slope in relation to a straight line between the leading edge second end and trailing edge second end; and
        v) wherein a straight line between the leading edge first end and the trailing edge first end and a straight line between the leading edge first and second end defines a first angle in the range of 25 degrees to 75 degrees, and a straight line between the leading edge second end and the trailing edge second end and the straight line defining the distance between the leading edge first and second ends defines a second angle which is substantially of the same magnitude as the first angle;
    b) a first handle attached to said first end of said leading edge and said first end of said trailing edge;
    c) a second handle attached to said second end of said leading edge and said second end of said trailing edge;
    whereby upon grasping said first handle and said second handle and lifting said support member the weight of the dog is partially supported and partially transferred to the support member.

2. The apparatus of claim 1 wherein the distance between said leading edge first end and said leading edge second is in the range of 25 inches to 45 inches, the distance between said trailing edge first end and said trailing edge second is in the range of 19 inches to 39 inches, and wherein the distance between the leading edge first and second ends exceeds the distance between the trailing edge first and second ends by an amount in the range of 0.5 inch to 13 inches.

3. The apparatus of claim 1 wherein the distance between the leading edge first and second ends is about 38 inches and the distance between the trailing edge first and second ends is about 30 inches.

4. The apparatus of claim 1 wherein the magnitude of the first and second angles is about 60 degrees.

5. The apparatus of claim 1 wherein said leading edge is substantially parallel to said trailing edge of said support member.

6. The apparatus of claim 1 wherein said support member has a width from about 5 inches to about 25 inches.

7. The apparatus of claim 1 wherein said support member has a width of about 8 inches.

8. The apparatus of claim 1 wherein reinforcing members are attached to said leading edge and said trailing edge of said support member.

9. The apparatus of claim 1 further including connecting means to secure the support member around the dog.

10. The apparatus of claim 1 wherein said support member is manufactured from single fill cotton duct.

11. The apparatus of claim 1 further including an alignment strap system attached to said first end of said leading edge of said support member, attached to said second end of said leading edge, and attached to a mid-point of said leading edge.

12. The apparatus of claim 11 wherein said strap system comprises a first strap having an adjustable length slidably attached to a second strap.

13. An apparatus for assisting a large dog traveling on an incline comprising:
   a) support member, the support member having:
      i) a leading edge having a first end and a second end,
      ii) a trailing edge having a first end and a second end;
      iii) a first upper edge having a first and second end, the first end of the first upper edge shared with the first end of the trailing edge and the second end of the first upper edge shared with the first end of the leading edge;
      iv) and a second upper edge having a first and second end, the first end of the second upper edge shared with the second end of the trailing edge and the second end of the second upper edge shared with the second end of the leading edge; and
      v) a bottom wherein said first upper edge has a slope in relation to a baseline of said bottom and said second upper edge has a slope in relation to said baseline of said bottom, said slope of the second upper edge equal to the slope of the first upper edge;
   b) a first handle attached to the first end of said first upper edge and attached to the second end of said first upper edge;
   c) a second handle attached to the first end of said second upper edge and attached to the second end of said second upper edge;
   whereby the attachment of the handles to the first and second sloped upper edges of the support member allows for even distribution of part of the dog's weight across the bottom of the support member when the handles are grasped and lifted as the dog travels on the incline.

14. The apparatus of claim 13 further including connecting means to secure the support member around the dog.

15. The apparatus of claim 14 wherein upon placing said support member around the dog and engaging said connecting means, said first upper edge and said second upper edge define a gap therebetween having a width from about 0.5 to about 4 inches.

16. The apparatus of claim 15 wherein the width of said gap between said first upper edge and said second upper edge is 2 inches.

17. The apparatus of claim 13 further including an adjustable alignment strap system attached to a first end of said first upper edge of said support member, attached to a first end of said second upper edge, and attached to said baseline of said support member.

18. The apparatus of claim 17 wherein said strap system comprises a first strap having an adjustable length slidably attached to a second strap.

19. A method for assisting a large dog traveling on an incline comprising:
   a) placing a support member having two handles beneath said dog, the support member having:
      i) a leading edge having a first end and a second end,
      ii) a trailing edge having a first end and a second end,
      iii) wherein the distance between the leading edge first and second ends exceed the distance between the trailing edge first and second ends, and
      iv) wherein a straight line between the leading edge first end and trailing edge first end and a straight line between the leading edge first and second end defines a first angle in the range of 25 degrees to 75 degrees, and a straight line between the leading edge second end and the trailing edge second end and the straight line defining the distance between the leading edge first and second ends defines a second angle which is substantially of the same magnitude as the first angle;
   b) placing an adjustable alignment strap system around the sternum of said dog and attaching said adjustable alignment strap system to said support member; and
   c) displacing weight from said dog to said support member by lifting said handles.

20. The method of assisting a dog in claim 19 wherein the support member is placed under the shoulders and lower chest of said dog whereby the ribcage of said dog is covered.

* * * * *